United States Patent [19]

Bauer et al.

[11] Patent Number: 4,548,987
[45] Date of Patent: Oct. 22, 1985

[54] ABS-POLYCARBONATE MIXTURES WHICH HAVE IMPROVED FLAME RESISTANCE

[75] Inventors: Wolfgang Bauer, Krefeld; Christian Lindner, Cologne; Friedemann Müller, Neuss; Hans-Jürgen Kress, Krefeld; Karl Zabrocki, Buettgen; Josef Buekers, Krefeld, all of Fed. Rep. of Germany

[73] Assignee: Bayer Aktiengesellschaft, Leverkusen, Fed. Rep. of Germany

[21] Appl. No.: 647,453

[22] Filed: Sep. 5, 1984

[30] Foreign Application Priority Data

Sep. 17, 1983 [DE] Fed. Rep. of Germany ....... 3333721

[51] Int. Cl.$^4$ ............................................. C08L 69/00
[52] U.S. Cl. .......................................... 525/67; 525/80
[58] Field of Search ......................... 525/67, 80, 148; 528/196

[56] References Cited

FOREIGN PATENT DOCUMENTS 2653143 5/1978 Fed. Rep. of Germany .

Primary Examiner—Theodore E. Pertilla
Attorney, Agent, or Firm—Connolly and Hutz

[57] ABSTRACT

ABS-polycarbonate mixtures consisting of an aromatic polycarbonate A, a graft polymer B having a rubber-like graft base and optionally a thermoplastic copolymer C have improved flame resistance if the total mixture contains a compound corresponding to the formulae

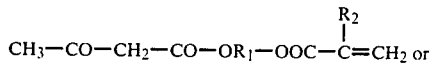

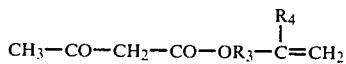

wherein
$R_1$ represents $C_2$-$C_6$ alkylene,
$R_2$ represents hydrogen or methyl,
$R_3$ represents a direct bond or $C_1$-$C_4$ alkylene, and
$R_4$ represents hydrogen, methyl or

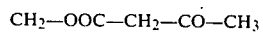

Polymerized in B or C or in B and C.

6 Claims, No Drawings

ABS-POLYCARBONATE MIXTURES WHICH HAVE IMPROVED FLAME RESISTANCE

This invention relates to ABS-polycarbonate mixtures (PC-ABS) which are based on specific copolymers and graft polymers of unsaturated monomers and copolymerisable acetyl acetate derivatives, the flame resistance of which mixtures is improved with respect to know PC-ABS. PC-ABS conventionally consists of
(A) at least one aromatic polycarbonate,
(B) at least one graft polymer which has a rubber-like graft base and
(C) optionally at least one thermoplastic copolymer of styrene and (meth)acrylonitrile, in which the styrene may be completely or partially substituted by α-methylstyrene, nuclear substituted styrenes, methyl methacrylate, maleic acid anhydride or substituted or unsubstituted maleic imide.

PC-ABS is a valuable starting material for the production of mouldings. This material suffers from the disadvantage that it is not sufficiently flame resistant and this considerably limits its use for parts which are subjected to thermal stresses or to the risk of fire, such as for audio and television equipment. Inorganic oxides, such as $Sb_2O_3$, or halogen-containing additives, such as octabromodiphenylether, may be used to improve the flame resistance of PC-ABS. These additives are only effective when used in a quantity of between 10 and 30% by weight, thereby substantially impairing the mechanical strength of the part.

It has now been found that the inflammability of PC-ABS may be substantially reduced by copolymerisation with specific monomers. The addition of flame-inhibiting additives may thereby be partially or completely avoided.

The present invention thus provides PC-ABS, comprising
(A) from 10–90% by weight of an aromatic polycarbonate;
(B) from 10–50% by weight of a graft polymer consisting of from 5 to 90% by weight of a mixture of
  (a) from 50–90% by weight of styrene, α-methylstyrene, nuclear-substituted styrene or methyl methacrylate or mixtures thereof,
  (b) from 10–50% by weight of (meth)acrylonitrile and
  (c) from 0–20% by weight of at least one further copolymerisable compound, on from 95–10% by weight of a rubber having a glass temperature $T_g \leq 0°$ C.; from 80–0% by weight of a copolymer consisting of
  (a) from 50–90% by weight of styrene, α-methylstyrene, nuclear-substituted styrene or methyl methacrylate or mixtures thereof.,
  (b) from 90–50% by weight of (meth)acrylonitrile and
  (c) from 0.2–20% by weight of a further copolymerisable compound; and
(D) optionally further conventional additives, the percentages by weight of A, B and C being based on the sum of A, B and C, and characterised in that the further copolymerisable compounds (Bc) and (Cc) correspond to one of the formulae

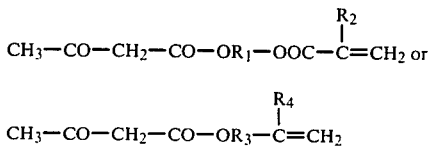

wherein
$R_1$ represents $C_2$-$C_6$ alkylene,
$R_2$ represents hydrogen or methyl,
$R_3$ represents a direct bond or $C_1$-$C_4$ alkylene and
$R_4$ represents hydrogen, methyl or $CH_2$—OO-C—$CH_2$—CO—$CH_3$, and the total quantity of (Bc) and (Cc) is from 0.2 to 25%, by weight, based on PC-ABS.

All aromatic polycarbonates are suitable. Polycarbonates consisting of dihydroxydiarylalkanes are particularly suitable. Preferred dihydroxydiarylalkanes are 4,4′-dihydroxydiphenylpropane-2,2(bisphenol A), tetramethylbisphenol A, tetrachlorobisphenol A, tetrabromobisphenol A and bis-(4-hydroxyphenyl)-p-diisopropylbenzene.

Branched polycabonates are also suitable. A portion of the dihydroxy compound, for example from 0.2 to 2 mol %, is substituted by a polyhydroxy compound for the production thereof. The following are examples of suitable polyhydroxy compounds: phloroglucin, 4,6-dimethyl-2,4,6-tri-(4-hydroxyphenyl)heptene-2; 4,6-dimethyl-2,4,6-tri-(4-hydroxyphenyl)heptane, 1,3,5-tri-(4-hydroxyphenyl)-benzene, 1,1,1-tri-(4-hydroxyphenyl)-ethane and 2,2-bis-4,4-(4,4′-dishydroxydiphenyl)-cyclohexylpropane.

Polycarbonates of this type are described in the U.S. Pat. Nos. 3,028,365, 2,999,835, 3,148,172, 3,271,368, 2,970,137, 2,991,273, 3,271,367, 3,280,078, 3,014,891 and 2,999,846. The polycarbonates preferably have a molecular weight ranging from 10,000 to 200,000 (weight average) and in particular from 20,000 to 40,000, determined by the relative viscosity in methylene chloride at 25° C.

The compounds (Bc) or (Cc) are known and are produced, by way of example, by reacting suitable OH—compounds with diketene or by transesterifying acetyl acetates with suitable OH—compounds.

Preferred compounds (Bc) and (Cc) are reaction products of diketen with OH-containing acrylic esters, for example with hydroxyethyl acrylate, hydroxypropyl acrylate, hydroxyethyl methacrylate and hydroxypropyl methacrylate.

From 60–75% of (Ba) and (Ca) from 32–20% of (Bb) and (Cb) and from 15–3% of (Bc) and (Cc) are preferably copolymerised.

Suitable nuclear-substituted styrenes Ba and Ca are, for example, styrene which has been substituted by $C_1$-$C_4$ alkyl, chlorine or bromine.

Styrene, α-methylstyrene and p-methylstyrene are preferred compounds Ba and Ca.

A quantity of (Bc) plus (Cc) of greater than 25% generally causes a decrease of the strength of the product, while a quantity of less than 0.2% is ineffective regarding flame resistance.

Polybutadiene, SBR, NBR, polybutylacrylate and EPDM are, for example, possible as rubber polymers.

The weight ratio of the polymerised monomers to the rubber in the graft polymer B is from 5:95 to 90:10 and preferably from 60:40 to 30:70.

All conventional polymerisation techniques, such as bulk polymerisation, solution polymerisation or emulsion polymerisation, are possible for producing the resin polymers C and for producing the graft polymers B (Ullmanns Encyclopadie der technischen Chemie, Vol. 19, Page 277 to 95; Verlag Chemie, Weinheim 1980).

Bulk polymerisation and emulsion polymerisation are preferred.

Resins C are generally very soluble in organic solvents and usually have an average molecular weight of from $6.10^3$ to $10^6$ and preferably $10^4$ to $2.10^5$ (number average).

The graft polymers B are only partially soluble. They preferably have a grafting degree G of from 0.3 to 1.0 according to the definition given in DE-AS 2 420 358.

Polycarbonates A may either be mixed with graft polymers B and resins C in a "wet" state, that is as a solution, suspension or emulsion or in a "dry" state, that is as a powder, granulated material or melt, and if the latter is chosen the substance is mixed as is conventional for thermoplasts in a kneader, a screw machine, a cylinder mill or other apparatus which is conventionally used in thermoplasts processing.

Conventional additives, such as stabilisers, lubricants, anti-static agents, fillers and pigments, may be added.

The moulding compositions are processed, for example, by granulation, injection moulding, extrusion, calendering, pressing or blow moulding.

The PC-ABS mixtures according to the present invention are distinguishable by their considerably improved flame resistance while maintaining their same good mechanical properties and good dimensional stability under heat.

Production of the Resin Polymers

After careful flushing with nitrogen at 65° C., a solution consisting of 0.5 kg of $K_2S_2O_8$ in water and 5 kg of the monomer mixture are introduced into a starting solution consisting of 100 kg of water and 0.25 kg of an alkylsulphonate as emulsifier. When copolymerisation has started the remainder of the monomer mixture and an aqueous solution of 4 kg of the emulsifier are metered over a period of 4 hours at from 65°-70° C.; the total monomer mixture weighs 100 kg. The mixture is subsequently stirred for a further 4 hours at from 65°-70° C.

The compound corresponding to the formula

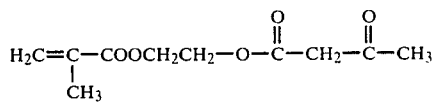

is used as component (Cc).

TABLE 1

| Resin polymer | Composition | | Monomer mixture | |
|---|---|---|---|---|
| | Styrene, α-methyl-styrene* | Acrylo-nitrile | Cc | t-DDM** (kg) |
| I | 62 | 28 | 10 | 0.4 |
| II | 67 | 28 | 5 | 0.4 |
| III | 69.5 | 28 | 2.5 | 0.4 |
| IV | 72 | 18 | 10 | 0.4 |
| V | 59* | 31 | 10 | 0.4 |
| VI (Comparison) | 72 | 28 | — | 0.4 |
| VII (Comparison) | 69* | 31 | — | 0.4 |

**tert.-Dodecylmercaptan as regulator

Production of the Graft Polymers

A polybutadiene latex having 50 kg of solids and an average particle diameter of 0.4 μm is introduced into a starting solution, diluted to 20% of solids heated with rinsing under $N_2$ to 65° C., 0.5 kg $K_2S_2O_8$ dissolved in water are added, 50 kg of monomer mixture and a solution of 2.0 kg of alkyl sulphonate emulsifier which has been adjusted to an alkaline value is subsequently added over a period of 4 hours. The mixture is allowed to react for a further 4 hours at 65°-70° C. The component (Cc) is the same as component (Bc) in the production of the resin.

TABLE 2

| Graft polymers | composition of the monomer mixture | | |
|---|---|---|---|
| | Styrene | Acrylonitrile | (Cc) |
| VIII | 36 | 14 | — |
| IX | 32.4 | 12.6 | 5.0 |
| X | 30.6 | 11.9 | 7.5 |

After addition of a stabiliser, the resins (kg) and graft polymers (kg) are separately precipitated by addition of salt, washed, dried and mixed on a two-shaft extruder with a polycarbonate (kg) consisting of tetrabromobisphenol A and bisphenol A in a weight ratio of 1:9; viscosity of solution $\eta_{rel}$ ($CH_2Cl_2$, 25° C.)=1.284.

TABLE 3

| Example | Polycarbonate (quantity) | Resin Polymer (quantity/type) | Graft Polymer (quantity/type) | Antimony-trioxide (kg) | $O_2$-Index* |
|---|---|---|---|---|---|
| 1 | 70 | 16.8/I | 11.2/VIII | 2 | 34 |
| 2 | 70 | 16.8/IV | 11.2/VIII | 2 | 33 |
| 3 (comparison) | 70 | 16.8/VI | 11.2/VIII | 2 | 28 |
| 4 | 70 | 16.8/VI | 11.2/X | 2 | 31 |
| 5 | 70 | 16.8/I | 11.2/X | 2 | 35 |
| 6 | 70 | 16.8/V | 11.2/VIII | 2 | 33 |
| 7 (comparison) | 70 | 16.8/VII | 11.2/VIII | 2 | 29 |

*ASTM, D 2863-70

We claim:

1. An ABS-polycarbonate mixture comprising
   (A) from 10–90% by weight of an aromatic polycarbonate,
   (B) from 10–50% by weight of a graft polymer which is from 5 to 90% by weight of a mixture of
      (a) from 50–90% by weight of styrene, α-methylstyrene, nuclear-substituted styrene or methyl methacrylate or mixture thereof,
      (b) from 10–50% by weight of (meth)-acrylonitrile and
      (c) from 0–20% by weight of at least one further copolymerisable compound, on from 95–10% by weight of a rubber having a glass temperature $T_G$ of $\leq 0°$ C., (C) from 80–0% by weight of copolymerized monomers
 (a) from 50–90% by weight of styrene, α-methylstyrene nuclear-substituted styrene or methyl methacrylate or mixture thereof,
 (b) from 90–50% by weight of (meth)acrylonitrile and
 (c) from 0.2–20% by weight of a further copolymerisable compound, the percentages by weight of A, B and C being based on the sum of A, B and C and the further co-polymerisable compounds (Bc) and (Cc) corresponding to one of the formulae

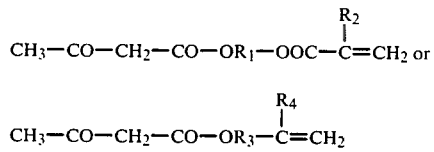

wherein
 $R_1$ represents $C_2$–$C_6$ alkylene,
 $R_2$ represents hydrogen or methyl,
 $R_3$ represents a direct bond or $C_1$–$C_4$ alkylene and
 $R_4$ represents hydrogen, methyl or $CH_2$—OO—C—$CH_2$—CO—$CH_3$ and the total quantity of (Bc) and (Cc) being from 0.2 to 25% by weight, based on PC-ABS.

2. A PC-ABS moulding composition according to claim 1, wherein the copolymer comprises from 60–75% by weight of (Ca), from 32–20% by weight of (Cb) and from 15–3% by weight of (Cc).

3. A PC-ABS moulding composition according to claim 1, or 2 a wherein a mixture of from 60–75% by weight of (Ba) from 32–20% by weight of (Bb) and from 15–3% by weight of (Bc) is used to produce the graft polymer.

4. A PC-ABS moulding composition according to any of claims 1 to 3, wherein a reaction product of diketene and hydroxyethyl(meth)acrylate or hydroxypropyl(meth)acrylate is used as compound (Bc) or (Cc).

5. A PC-ABS moulding composition according to any of claims 1 to 4 wherein the weight ratio of the polymerised monomers to the rubber in the graft polymer B is from 60:40 to 30:70.

6. A moulded article produced from a moulding composition according to any of claims 1 to 5.

* * * * *